United States Patent
Harrington (10) Patent No.: US 9,445,949 B1
(45) Date of Patent: Sep. 20, 2016

(54) SYSTEM AND METHOD FOR PROCESSING COMMANDS IN AN ONLINE GAME

(71) Applicant: KABAM, INC., San Francisco, CA (US)

(72) Inventor: Clifford J. Harrington, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 174 days.

(21) Appl. No.: 13/907,727

(22) Filed: May 31, 2013

(51) Int. Cl.
| | |
|---|---|
| *A63F 13/44* | (2014.01) |
| *A61F 13/12* | (2006.01) |
| *A63F 13/355* | (2014.01) |
| *A63F 13/40* | (2014.01) |
| *A63F 13/352* | (2014.01) |

(52) U.S. Cl.
CPC ............... *A61F 13/12* (2013.01); *A63F 13/44* (2014.09); *A63F 13/352* (2014.09); *A63F 13/355* (2014.09); *A63F 13/40* (2014.09)

(58) Field of Classification Search
CPC ........ A63F 13/10; A63F 13/12; A63F 13/20; A63F 13/30; A63F 13/33; A63F 13/35; A63F 13/352; A63F 13/358; A63F 13/40; A63F 13/42; A63F 13/44; A63F 13/822; A63F 2300/40; A63F 2300/407; A63F 2300/409; A63F 2300/50; A63F 2300/513; A63F 2300/53; A63F 2300/531; A63F 2300/534; A63F 2300/5533; A63F 2300/5593; A63F 2300/6045; A63F 2300/807
See application file for complete search history.

(56) References Cited

U.S. PATENT DOCUMENTS

| | | | | |
|---|---|---|---|---|
| 7,445,549 | B1 * | 11/2008 | Best | 463/32 |
| 8,147,339 | B1 | 4/2012 | Perry | 463/42 |
| 8,287,341 | B1 | 10/2012 | Reynolds et al. | 463/9 |
| 2003/0078103 | A1 | 4/2003 | LeMay | |
| 2005/0192098 | A1 * | 9/2005 | Guo et al. | 463/42 |
| 2007/0270225 | A1 | 11/2007 | Wang et al. | 463/42 |
| 2008/0070688 | A1 | 3/2008 | Loehrer | 463/42 |
| 2012/0059783 | A1 | 3/2012 | Fiedler | |
| 2012/0072485 | A1 | 3/2012 | Hutcheson et al. | 709/203 |
| 2013/0047217 | A1 | 2/2013 | Shuster et al. | 726/4 |

OTHER PUBLICATIONS

Electronic Arts Inc., EA Sports Madden 2002 game manual, 2001, 56 pages.

* cited by examiner

*Primary Examiner* — Damon Pierce
(74) *Attorney, Agent, or Firm* — Sheppard Mullin Richter & Hampton LLP (57) ABSTRACT

One aspect of the disclosure relates to processing commands in an online game, and particularly for assigning an order for the execution of commands in the online game such that the commands are executed in that order by disparate servers. The online game may be played by a plurality of users via a respective plurality of client computing devices. Commands may be received at a plurality of game servers from a plurality of users via a plurality of client computing devices. A central server may receive the commands from the respective game servers and may assign sequence numbers for the received commands. The commands may be performed in sequential order. By executing commands in sequential order by the plurality of game servers, the virtual world of the online game may be presented in a consistent way to the plurality of users of the online game.

13 Claims, 3 Drawing Sheets

SYSTEM AND METHOD FOR PROCESSING COMMANDS IN AN ONLINE GAME

FIELD

The disclosure relates to processing commands in an online game, and particularly for assigning an order for the execution of commands in the online game such that the commands are executed in that order by disparate servers.

BACKGROUND

Various techniques for executing commands for an online game and updating a game state for the online game are known. For example, a game system interface may act as a controller to monitor loads of various game servers. In another example, game state information may be coded and sequential instructions may be related in order to more efficiently execute commands in the online game.

Conventional systems, however, suffer from various drawbacks and inefficiencies relating to efficiently executing commands while maintaining consistent game state information for an online game. For example, conventional systems may fail to efficiently process commands via a database. To that end, conventional systems may fail to use a central server to assign sequence numbers to commands, such that the commands are performed by respective web servers/job servers in sequential order.

SUMMARY

One aspect of the disclosure relates to processing commands in an online game, and particularly for assigning an order for the execution of commands in the online game such that the commands are executed in that order by disparate servers. The online game may be played by a plurality of users via a respective plurality of client computing devices. Commands may be received at a plurality of game servers from a plurality of users via a plurality of client computing devices. A central server may receive the commands from the respective game servers and may assign sequence numbers for the received commands. The commands may be performed in sequential order. By executing commands in sequential order by the plurality of game servers, the virtual world of the online game may be presented in a consistent way to the plurality of users of the online game.

A system may be configured to facilitate processing commands in an online game. The system may comprise, for example, a game server comprising one or more physical processors. The physical processors may be configured to execute computer program modules. The computer program modules may comprise, for example, a space module, a user module, a command reception module, a command transmission module, a command ordering module, a command execution module, and/or other computer program modules.

A space module may be configured to execute an instance of a virtual space and to implement the instance of the virtual space to facilitate participation by one or more users in the online game within the virtual space through one or more client computing platforms associated with the one or more users.

A command reception module may be configured to receive a plurality of commands from individual ones of the client computing platforms. The commands may be based on inputs of one or more users at the one or more client computing platforms.

A command transmission module may be configured to transmit the plurality of commands to a central server. The plurality of commands may be transmitted with a time stamp indicating a time at which the individual order was received.

A command ordering module may be configured to receive a plurality of augmented commands from the central server. An individual augmented command may comprise an individual command that has been augmented with a sequence number indicating an order in which the individual command is to be executed.

A command execution module may be configured to execute the plurality of augmented commands according to the respective plurality of sequence numbers.

The system may also comprise a central server comprising one or more physical processors configured to execute compute program modules. The computer program modules may comprise, for example, a command reception module, a command ordering module, a command transmission module, and/or other computer program modules.

A command reception module of the central server may be configured to receive a plurality of commands from a plurality of game servers. As mentioned above, an individual game server may be configured to execute an instance of a virtual space and to implement the instance of the virtual space to facilitate participation by one or more users in the online game via respective one or more client computing platforms.

A command ordering module of the central server may be configured to augment the plurality of commands received from the plurality of game servers with a respective plurality of sequence numbers. The command ordering module may augment an individual command with a respective sequence number which indicates an order in which the individual command is to be executed.

A command transmission module of the central server may be configured to transmit the plurality of augmented commands to the corresponding game servers.

A computer-implemented method of processing commands in an online game may be implemented in a computer system comprising one or more physical processors. The method may comprise: executing an instance of a virtual space, and to implement the instance of the virtual space to facilitate participation by the one or more users in the online game within the virtual space on the one or more client computing platforms; receiving a plurality of commands from individual ones of the client computing platforms, wherein the commands are based on inputs of one or more users at the one or more client computing platforms; transmitting the plurality of commands to a central server, wherein the plurality of commands are transmitted with a time stamp indicating a time at which the individual order was received; receiving a plurality of augmented commands from the central server, wherein an individual augmented command comprises an individual command that has been augmented with a sequence number indicating an order in which the individual command is to be executed; and executing the plurality of augmented commands according to the respective plurality of sequence numbers.

A non-transitory electronic storage media may store information related to facilitating processing commands in an online game. The stored information may comprise a memory configured to store information related to the online game and instructions configured to cause a client computing platform to perform functionality. For example, the instructions may be configured to cause a client computing platform to: execute an instance of a virtual space, and to implement the instance of the virtual space to facilitate participation by the one or more users in the online game within the virtual space on the one or more client computing platforms; receive a plurality of commands from individual ones of the client computing platforms, wherein the commands are based on inputs of one or more users at the one or more client computing platforms; transmit the plurality of commands to a central server, wherein the plurality of commands are transmitted with a time stamp indicating a time at which the individual order was received; receive a plurality of augmented commands from the central server, wherein an individual augmented command comprises an individual command that has been augmented with a sequence number indicating an order in which the individual command is to be executed; and execute the plurality of augmented commands according to the respective plurality of sequence numbers.

A computer-implemented method of processing commands in an online game may be implemented in a computer system comprising one or more physical processors. The method may comprise receiving a plurality of commands from a plurality of game servers, an individual game server being configured to execute an instance of a virtual space, and to implement the instance of the virtual space to facilitate participation by one or more users in the online game via respective one or more client computing platforms; augmenting the plurality of commands received from the plurality of game servers with a respective plurality of sequence numbers, wherein an individual sequence number augmenting an individual command indicates an order in which the individual command is to be executed; and transmitting the plurality of augmented commands to the corresponding game servers.

A non-transitory electronic storage media may store information related to facilitating processing commands in an online game. The stored information may comprise a memory configured to store information related to the online game and instructions configured to cause a game server to perform functionality For example, the instructions may be configured to cause a client computing platform to: receive a plurality of commands from a plurality of game servers, an individual game server being configured to execute an instance of a virtual space, and to implement the instance of the virtual space to facilitate participation by one or more users in the online game via respective one or more client computing platforms; augment the plurality of commands received from the plurality of game servers with a respective plurality of sequence numbers, wherein an individual sequence number augmenting an individual command indicates an order in which the individual command is to be executed; and transmit the plurality of augmented commands to the corresponding game servers.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
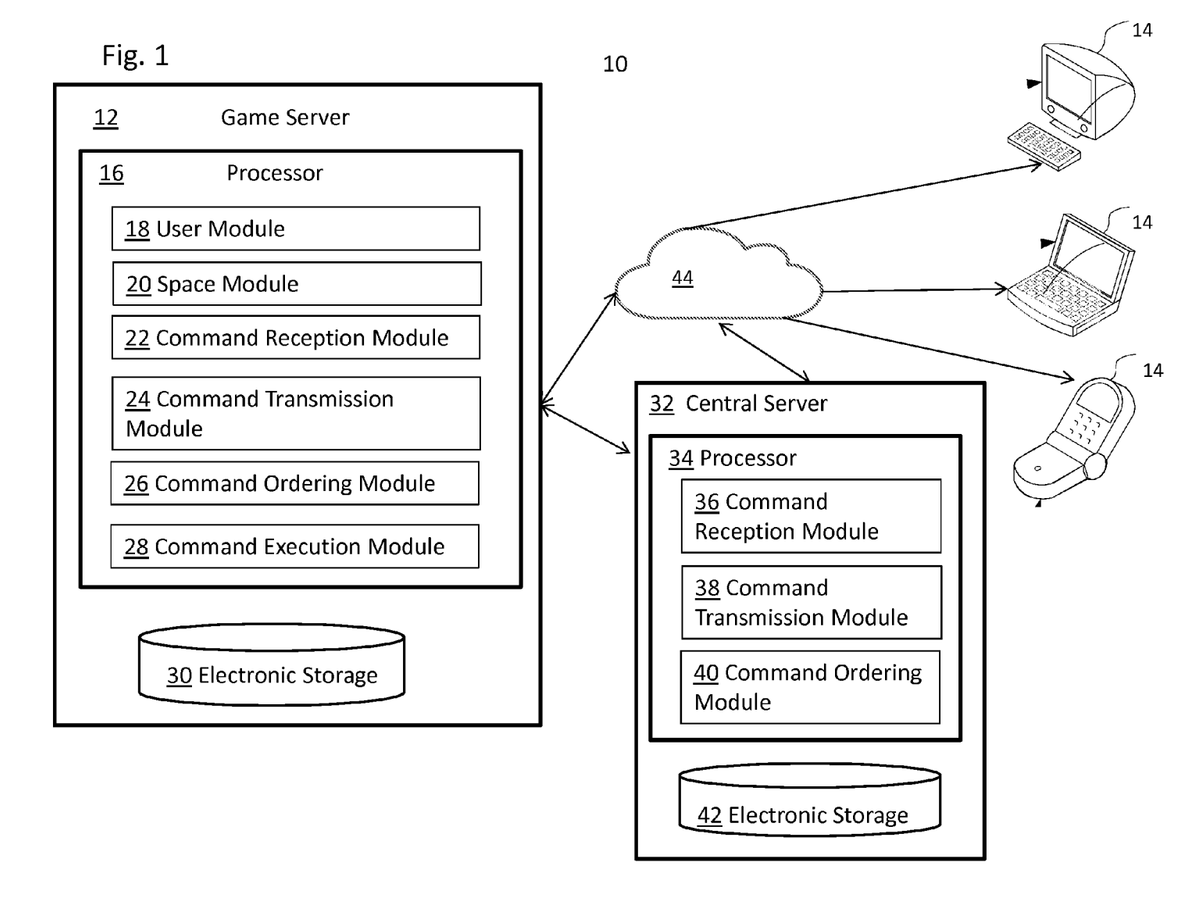
FIG. 1 illustrates a system configured to facilitate processing commands in an online game, according to various aspects of the invention.

FIG. 1 illustrates a system 10 configured to facilitate processing commands in an online game. In some implementations, system 10 may include a game server 12 and a central server 32. The game server 12 may be configured to communicate with one or more client computing platforms 14 according to a client/server architecture. The users may access system 10 and/or the virtual space via client computing platforms 14. The central server 32 may be configured to communicate with the game server 12.

The game server 12 may be configured to execute one or more computer program modules. The computer program modules may include one or more of a user module 18, a space module 20, a command reception module 22, a command transmission module 24, a command ordering module 26, a command ordering module 28, a command execution module 28, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 20 may be configured to implement the instance of the virtual space executed by the computer modules to determine state of the virtual space. The state may then be communicated (e.g., via streaming visual data, via object/position data, and/or other state information) from game server 12 to client computing platforms 14 for presentation to users. The state determined and transmitted to a given client computing platform 14 may correspond to a view for a user character being controlled by a user via the given client computing platform 14. The state determined and transmitted to a given client computing platform 14 may correspond to a location in the virtual space. The view described by the state for the given client computing platform 14 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 20 is not intended to be limiting. The space module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through game server 12 (e.g., through space module 20).

A command reception module 22 may be configured to receive a plurality of commands from individual ones of the client computing platforms 14. The command reception module 22 may receive a command that based on an input of a user at a client computing platform 14. The command may facilitate participation by a user in the instance of the virtual space by controlling one or more of the available user controlled elements in the virtual space. The command may comprise one or more instructions that control one or more of the available user controlled elements in the virtual space. The command may also comprise a time stamp indicating a time at which the command was received at the client computing platform 14.

A command transmission module 24 may be configured to transmit the plurality of commands to the central server 32. An individual command may be transmitted with a respective time stamp indicating a time at which the individual command was received.

A command ordering module 26 may be configured to receive a plurality of augmented commands from the central server 32. The plurality of augmented commands correspond to the plurality of commands transmitted to the central server 32 by the command transmission module 24. An individual augmented command may comprise an individual command that has been augmented with a sequence number indicating an order in which the individual command is to be executed. In some implementations, a first command and a second command of the plurality of commands received via the command reception module 22 may be augmented with a first sequence number and a second sequence number consecutive to the first sequence number. In some implementations, the second sequence number may not be consecutive to the first sequence number. In these implementations, the second sequence number may have a time stamp closest to the time stamp of the first sequence number.

A command execution module 28 may be configured to execute the plurality of augmented commands according to the respective plurality of sequence numbers. In some implementations, the command execution module 28 may be configured to receive a signal from the central server indicating that the first augmented command should be executed. In an implementation where the second sequence number is consecutive to the first sequence number, the command execution module 28 may execute the first augmented command, and execute the second augmented command associated with the second sequence number. In this implementation, the command execution module 28 may continue to execute augmented commands associated with respective consecutive sequence numbers until a next command to be executed does not have a consecutive sequence number to the previously executed command. Responsive to a determination that a next command to be executed does not have a sequence number consecutive to the previously executed command, the command execution module 28 may transmit a signal to the central server 32 indicating that the previously executed signal was executed. The command execution module 28 may wait to execute the next command until a signal is received from the central server 32 indicating that the next command should be executed. For example, in an implementation where the second sequence number is not consecutive to the first sequence number, the command execution module 28 may execute the first command, and transmit a signal to the central server 32 indicating that the first command was executed. Responsive to a determination that the command execution module 28 received a signal from the central server 32 indicating that the second command should be executed, the command execution module 28 may execute the second command.

In some implementations, regardless of whether sequence numbers associated with the first command and the second command are consecutive, the command execution module 28 may be configured to transmit a signal to the central server indicating that the first augmented command was executed responsive to a determination that the first augmented command was executed. In these implementations, the command execution module 28 may wait to execute the second command until the command execution module 28 receives a signal from the central server indicating that the second augmented command should be executed.

As mentioned above, the system 10 may also comprise a central server 32 comprising one or more physical processors configured to execute compute program modules. The computer program modules may comprise, for example, a command reception module 36, a command ordering module 38, a command transmission module 40, and/or other computer program modules.

A command reception module 36 of the central server 32 may be configured to receive a plurality of commands from a plurality of game servers 12. As mentioned above, an individual game server 12 may be configured to execute an instance of a virtual space and to implement the instance of the virtual space to facilitate participation by one or more users in the online game via respective one or more client computing platforms 14.

A command ordering module 38 of the central server 32 may be configured to augment the plurality of commands received from the plurality of game servers 12 with a respective plurality of sequence numbers. The command ordering module 38 may augment an individual command with a respective sequence number which indicates an order in which the individual command is to be executed.

The command ordering module 28 may be configured to augment the plurality of commands with the respective plurality of sequence numbers based on a respective plurality of time stamps associated with the received plurality of commands. The sequence numbers assigned to the plurality of commands may be assigned regardless of whether the commands were received consecutively at a single game server 12. For example, a first command with a first time stamp and a second command with a second time stamp may have been received at a first game server 12 and transmitted to the central server 32. A third command with a third time stamp may have been received at a second game server 12 and transmitted to the central server. The third command may have a time stamp with a time of receipt at the second game server 12 that is between the first time stamp and the second time stamp. Accordingly, the command ordering module 28 may associate the first command with a first sequence number, the third command with a second sequence number consecutive to the first sequence number, and the second command with a third sequence number consecutive to the second sequence number.

In some implementations, the time stamp of the first command may match exactly the time stamp associated with the second command. In these implementations, the command ordering module may be configured to augment the first command and the second command based on one or more characteristics associated with the command, the originating game server 12, and/or other attributes associated with the command. For example, the command ordering module 12 may augment the first command and the second command with sequence numbers based on one or more of: a type of command of the first command compared to a type of command of the second command, a type of game state attribute affected by the first command compared to a type of game state attribute affected by the second command, a number of commands received from the first game server compared to a number of commands received from the second game server, and/or other features of the first command and the second command.

A command transmission module 40 of the central server 32 may be configured to transmit the plurality of augmented commands to the corresponding game servers 12.

The game server 12 may include electronic storage 30, one or more processors 16, and/or other components. The game server 12 may include communication lines, or ports to enable the exchange of information with a network and/or other computing platforms. Illustration of game server 12 in FIG. 1 is not intended to be limiting. The game server 12 may include a plurality of hardware, software, and/or firmware components operating together to provide the functionality attributed herein to game server 12. For example, game server 12 may be implemented by a cloud of computing platforms operating together as game server 12.

Electronic storage 30 may comprise electronic storage media that electronically stores information. The electronic storage media of electronic storage 30 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, and 28. Processor 16 may be configured to execute modules 18, 20, 22, 24, 26, and 28 by software; hardware; firmware; some combination of software, hardware, and/or firmware; and/or other mechanisms for configuring processing capabilities on processor 16.

It should be appreciated that although modules 18, 20, 22, 24, 26, and 28 are illustrated in FIG. 1 as being co-located within a single processing unit, in implementations in which processor 16 includes multiple processing units, one or more of modules 18, 20, 22, 24, 26, and 28 may be located remotely from the other modules. The description of the functionality provided by the different modules 18, 20, 22, 24, 26, and 28 described below is for illustrative purposes, and is not intended to be limiting, as any of modules 18, 20, 22, 24, 26, and 28 may provide more or less functionality than is described. For example, one or more of modules 18, 20, 22, 24, 26, and 28 may be eliminated, and some or all of its functionality may be provided by other ones of modules 18, 20, 22, 24, 26, and 28. As another example, processor xx may be configured to execute one or more additional modules that may perform some or all of the functionality attributed below to one of modules 18, 20, 22, 24, 26, and 28.

The central server 32 may include electronic storage 30, one or more processors 16, and/or other components. The central server 32 may include communication lines, or ports to enable the exchange of information with a network and/or other computing platforms. Illustration of central server 32 in FIG. 1 is not intended to be limiting. The central server 32 may include a plurality of hardware, software, and/or firmware components operating together to provide the functionality attributed herein to central server 32. For example, central server 32 may be implemented by a cloud of computing platforms operating together as central server 32.

Electronic storage 42 may comprise electronic storage media that electronically stores information. The electronic storage media of electronic storage 42 may include one or both of system storage that is provided integrally (i.e., substantially non-removable) with central server 32 and/or removable storage that is removably connectable to central server 32 via, for example, a port (e.g., a USB port, a firewire port, etc.) or a drive (e.g., a disk drive, etc.). Electronic storage 42 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 42 may include one or more virtual storage resources (e.g., cloud storage, a virtual private network, and/or other virtual storage resources). Electronic storage 30 may store software algorithms, information determined by processor 34, information received from central server 32, information received from game servers 12, information received from client computing platforms 14, and/or other information that enables game server 12 to function as described herein.

Processor(s) 34 is configured to provide information processing capabilities in central server 32. As such, processor 34 may include one or more of a digital processor, an analog processor, a digital circuit designed to process information, an analog circuit designed to process information, a state machine, and/or other mechanisms for electronically processing information. Although processor 34 is shown in FIG. 1 as a single entity, this is for illustrative purposes only. In some implementations, processor 34 may include a plurality of processing units. These processing units may be physically located within the same device, or processor 34 may represent processing functionality of a plurality of devices operating in coordination. The processor 16 may be configured to execute modules 36, 38, and 40. Processor 34 may be configured to execute modules 36, 38, and 40 by software; hardware; firmware; some combination of software, hardware, and/or firmware; and/or other mechanisms for configuring processing capabilities on processor 34.

It should be appreciated that although modules 36, 38, and 40 are illustrated in FIG. 1 as being co-located within a single processing unit, in implementations in which processor 34 includes multiple processing units, one or more of modules 36, 38, and 40 may be located remotely from the other modules. The description of the functionality provided by the different modules 36, 38, and 40 described below is for illustrative purposes, and is not intended to be limiting, as any of modules 36, 38, and 40 may provide more or less functionality than is described. For example, one or more of modules 36, 38, and 40 may be eliminated, and some or all of its functionality may be provided by other ones of modules 36, 38, and 40. As another example, processor 34 may be configured to execute one or more additional modules that may perform some or all of the functionality attributed below to one of modules 36, 38, and 40

Figure 2:
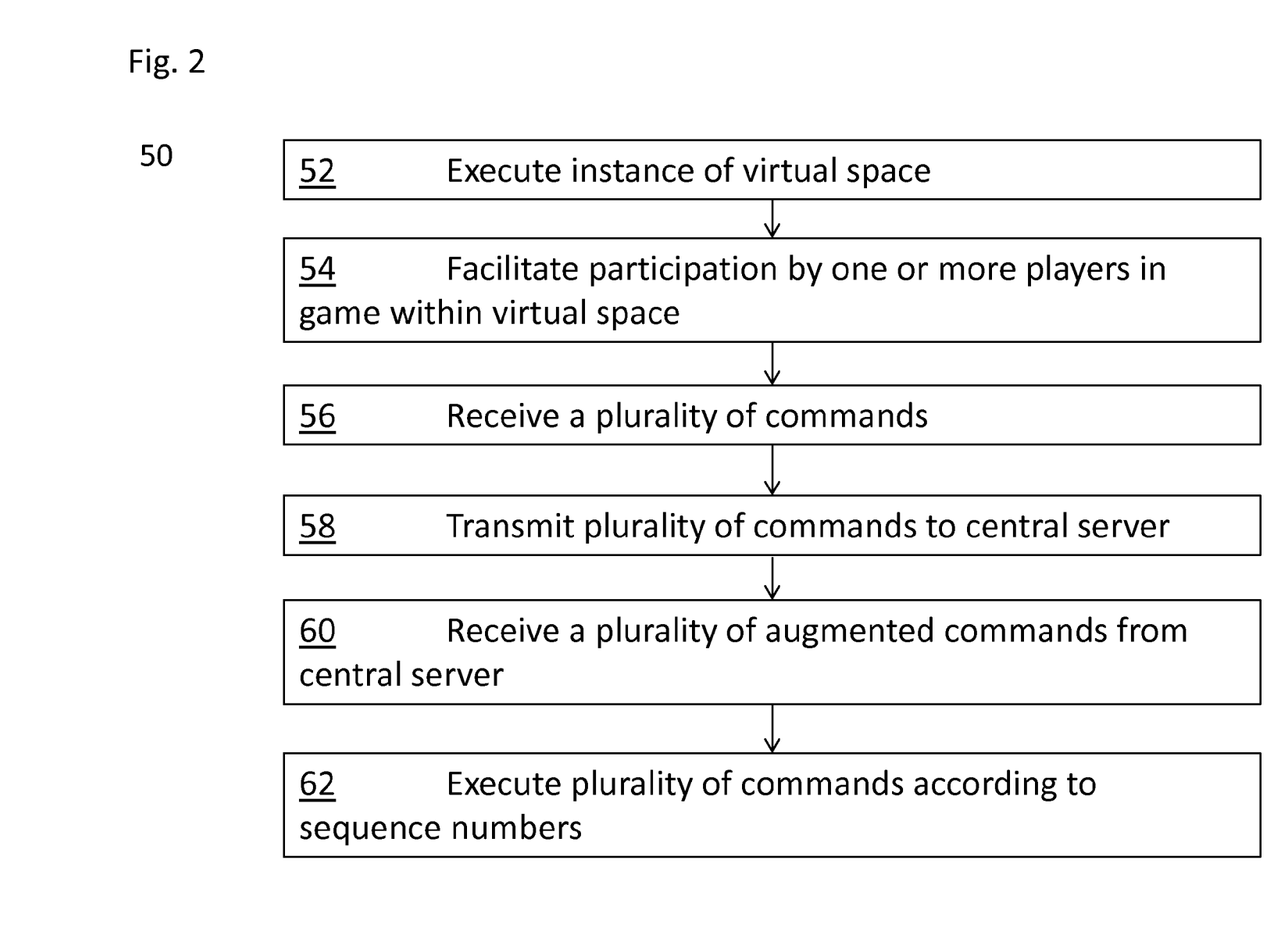
FIG. 2 illustrates an exemplary method of facilitate processing commands in an online game, according to various aspects of the invention.

FIG. 2 illustrates a method 50 of facilitating processing commands in an online game. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a space module the same as or similar to space module 20 (shown in FIG. 1 and described above).

At an operation 54, the executed instance of the virtual space may be implemented to determine view information. The view information may define views to be presented to users via client computing platforms. In some implementations, operation 54 may be performed by a space module the same as or similar to space module 20 (shown in FIG. 1 and described above).

At an operation 56, a plurality of commands may be received. In some implementations, operation 56 may be performed by a command reception module the same as or similar to command reception module 22 (shown in FIG. 1 and described above).

At an operation 58, the plurality of commands may be transmitted to the central server 32. In some implementations, operation 58 may be performed by a command transmission module the same as or similar to command transmission module 24 (shown in FIG. 1 and described above).

At an operation 60, a plurality of augmented commands may be received from the central server 32. In some implementations, operation 60 may be performed by an command ordering module the same as or similar to command ordering module 26 (shown in FIG. 1 and described above).

At an operation 62, the plurality of augmented commands may be executed. In some implementations, operation 62 may be performed by a command execution module the same as or similar to command execution module 26 (shown in FIG. 1 and described above).

Figure 3:
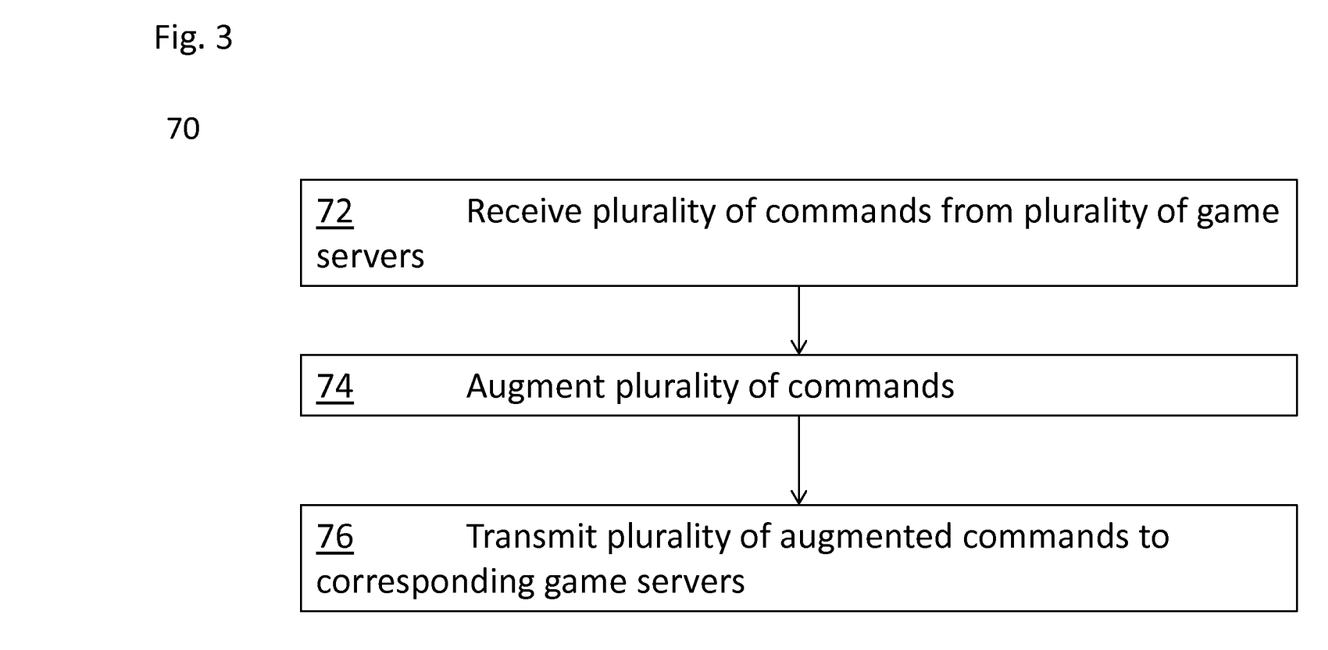
FIG. 3 illustrates an exemplary method of facilitate processing commands in an online game, according to various aspects of the invention.

FIG. 3 illustrates a method 70 of facilitating processing commands in an online game. The operations of method 70 presented below are intended to be illustrative. In some embodiments, method 70 may be accomplished with one or more additional operations not described, and/or without one or more of the operations discussed. Additionally, the order in which the operations of method 70 are illustrated in FIG. 3 and described below is not intended to be limiting.

In some embodiments, method 70 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 70 in response to instructions stored electronically on an electronic storage medium. The one or more processing devices may include one or more devices configured through hardware, firmware, and/or software to be specifically designed for execution of one or more of the operations of method 70.

At an operation 72, a plurality of commands may be received from a plurality of game servers. In some implementations, operation 72 may be performed by a command reception module the same as or similar to command reception module 36 (shown in FIG. 1 and described above).

At an operation 74, the plurality of commands may be augmented. In some implementations, operation 74 may be performed by a command ordering module the same as or similar to command ordering module 38 (shown in FIG. 1 and described above).

At an operation 76, the plurality of augmented commands may be transmitted to respective game servers. In some implementations, operation 76 may be performed by a command transmission module the same as or similar to command transmission module 40 (shown in FIG. 1 and described above).

At an operation 78, the plurality of commands may be transmitted to the central server 32. In some implementations, operation 78 may be performed by a command transmission module the same as or similar to command transmission module 24 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate processing commands in an online game, the system comprising:
    a game server comprising one or more physical processors configured by machine-readable instructions to:
    execute an instance of a virtual space, and to implement the instance of the virtual space to facilitate participation by one or more users in the online game within the virtual space on one or more client computing platforms;
    receive a plurality of commands from individual ones of the client computing platforms, wherein the commands are based on inputs of one or more users at the one or more client computing platforms;
    transmit the plurality of commands to a central server, wherein the plurality of commands are transmitted with a time stamp indicating a time at which an individual order was received;
    receive a plurality of augmented commands from the central server, wherein an individual augmented command comprises an individual command that has been augmented with a sequence number indicating an order in which the individual command is to be executed, wherein a first augmented command is associated with a time stamp closest to a time stamp associated with a second augmented command of each of the plurality of augmented commands, and wherein a first sequence number associated with the first augmented command is not consecutive with a second sequence number associated with the second augmented command; and
    execute the plurality of augmented commands according to the respective plurality of sequence numbers.

2. The system of claim 1, wherein a first command of the plurality of augmented commands is associated with a first sequence number, and a second command of the plurality of augmented commands is associated with a second sequence number, wherein the first sequence number is consecutive to the second sequence number.

3. The system of claim 2, wherein the one or more processors are further configured by machine-readable instructions to:
    receive a signal from the central server indicating that the first augmented command should be executed;
    execute the first augmented command;
    execute the second augmented command associated with the second sequence number consecutive to the first sequence number associated with the first augmented command.

4. The system of claim 3,
    wherein a third augmented command of the plurality of augmented commands is associated with a third sequence number, wherein the third sequence number is consecutive to the second sequence number, and
    wherein a fourth augmented command of the plurality of augmented commands is associated with a fourth sequence number, wherein the fourth sequence number is not consecutive to the third sequence number, and
    wherein the one or more processors are further configured by machine-readable instructions to:
    execute the third augmented command associated with the third sequence number consecutive to the second sequence number; and
    transmit a signal to the central server indicating that the third augmented command was executed.

5. The system of claim 1, wherein the one or more processors are further configured by machine-readable instructions to transmit a signal to the central server indicating that the first augmented command was executed responsive to a determination that the first augmented command was executed.

6. The system of claim 5, wherein the one or more processors are further configured by machine-readable instructions to receive a signal from the central server indicating that the second augmented command should be executed.

7. A computer-implemented method of processing commands in an online game, the method being implemented in a computer system comprising one or more physical processors, the method comprising:

executing an instance of a virtual space, and to implement the instance of the virtual space to facilitate participation by one or more users in the online game within the virtual space on one or more client computing platforms;

receiving a plurality of commands from individual ones of the client computing platforms, wherein the commands are based on inputs of one or more users at the one or more client computing platforms;

transmitting the plurality of commands to a central server, wherein the plurality of commands are transmitted with a time stamp indicating a time at which an individual order was received;

receiving a plurality of augmented commands from the central server, wherein an individual augmented command comprises an individual command that has been augmented with a sequence number indicating an order in which the individual command is to be executed, wherein a first augmented command is associated with a time stamp closest to a time stamp associated with a second augmented command of each of the plurality of augmented commands, and wherein a first sequence number associated with the first augmented command is not consecutive with a second sequence number associated with the second augmented command; and executing the plurality of augmented commands according to the respective plurality of sequence numbers.

8. The method of claim 7, wherein a first command of the plurality of augmented commands is associated with a first sequence number, and a second command of the plurality of augmented commands is associated with a second sequence number, wherein the first sequence number is consecutive to the second sequence number.

9. The method of claim 8, wherein executing the plurality of augmented commands comprises:

receiving a signal from the central server indicating that the first augmented command should be executed;

executing the first augmented command;

executing the second augmented command associated with the second sequence number consecutive to the first sequence number associated with the first augmented command.

10. The method of claim 9, wherein a third augmented command of the plurality of augmented commands is associated with a third sequence number, wherein the third sequence number is consecutive to the second sequence number, and wherein a fourth augmented command of the plurality of augmented commands is associated with a fourth sequence number, wherein the fourth sequence number is not consecutive to the third sequence number, the method further comprising:

executing the third augmented command associated with the third sequence number consecutive to the second sequence number; and transmitting a signal to the central server indicating that the third augmented command was executed.

11. The method of claim 7, further comprising:

transmitting a signal to the central server indicating that the first augmented command was executed.

12. The method of claim 11, further comprising:

receiving a signal from the central server indicating that the second augmented command should be executed.

13. A non-transitory electronic storage media storing information related to facilitating processing commands in an online game, the stored information comprising:

a memory configured to store information related to the online game;

instructions configured to cause a client computing platform to:

execute an instance of a virtual space, and to implement the instance of the virtual space to facilitate participation by one or more users in the online game within the virtual space on one or more client computing platforms;

receive a plurality of commands from individual ones of the client computing platforms, wherein the commands are based on inputs of one or more users at the one or more client computing platforms;

transmit the plurality of commands to a central server, wherein the plurality of commands are transmitted with a time stamp indicating a time at which an individual order was received;

receive a plurality of augmented commands from the central server, wherein an individual augmented command comprises an individual command that has been augmented with a sequence number indicating an order in which the individual command is to be executed, wherein a first augmented command is associated with a time stamp closest to a time stamp associated with a second augmented command of each of the plurality of augmented commands, and wherein a first sequence number associated with the first augmented command is not consecutive with a second sequence number associated with the second augmented command; and execute the plurality of augmented commands according to the respective plurality of sequence numbers.

* * * * *